(12) United States Patent
Fournier

(10) Patent No.: US 7,588,372 B2
(45) Date of Patent: Sep. 15, 2009

(54) GUIDE WHEEL HAVING A BEARING FOR FOOD AND BEVERAGE APPLICATIONS

(75) Inventor: Stephen Fournier, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 280 days.

(21) Appl. No.: 11/279,615

(22) Filed: Apr. 13, 2006

(65) Prior Publication Data
US 2007/0242909 A1    Oct. 18, 2007

(51) Int. Cl.
*F16C 33/76* (2006.01)
(52) U.S. Cl. .................... 384/478; 384/484; 384/488
(58) Field of Classification Search .............. 384/449, 384/546, 547, 477, 478, 480, 484, 488, 460
See application file for complete search history.

(56) References Cited

U.S. PATENT DOCUMENTS

| | | | | |
|---|---|---|---|---|
| 2,639,954 A | * | 5/1953 | Potter | 384/484 |
| 2,647,808 A | * | 8/1953 | Spurgeon | 384/477 |
| 3,111,351 A | * | 11/1963 | Tanke | 384/460 |
| 3,141,710 A | * | 7/1964 | Lehman | 384/477 |
| 3,648,824 A | | 3/1972 | Speck | |
| 3,655,031 A | | 4/1972 | Cahn | |
| 3,687,261 A | | 8/1972 | Guckel | |
| 4,011,938 A | | 3/1977 | Kain | |
| 4,018,032 A | | 4/1977 | Dempsey | |
| 4,049,328 A | | 9/1977 | Ouska | |
| 4,174,031 A | | 11/1979 | Macleod | |
| 4,228,889 A | | 10/1980 | Garrison | |
| 4,392,695 A | * | 7/1983 | Miller | 384/477 |
| 4,602,875 A | * | 7/1986 | Doerr et al. | 384/547 |
| 4,639,149 A | * | 1/1987 | Bras et al. | 384/477 |
| 4,903,820 A | | 2/1990 | Fyfe | |
| 4,919,253 A | | 4/1990 | Morrison | |

(Continued)

FOREIGN PATENT DOCUMENTS

| | | |
|---|---|---|
| EP | 0 263 337 B1 | 8/1992 |
| EP | 0 486 151 B1 | 4/1996 |
| WO | WO 01/15857 A1 | 3/2001 |

OTHER PUBLICATIONS

Conveyors: Power Driven; http://www.uspto.gov/web/patents/classification/uspc198/sched198.htm.

(Continued)

*Primary Examiner*—Thomas R Hannon
(74) *Attorney, Agent, or Firm*—Michael A. Glenn; Glenn Patent Group

(57) ABSTRACT

The invention provides a wheel design that incorporates both a shield and seal on both sides of the guide wheel to eliminate direct liquid pressure on the seal. By retaining the lubrication, bearing life is extended, dramatically reducing machine downtime. In the presently preferred embodiment, the combination of a guide wheel with two rubber spring return (RSR) seals in-bound of two shields, increases guide wheel life through the following: The shields prevent the direct force of a high pressure wash-down from reaching the seal directly. There is a non-direct path between the shield and the outer raceway of the guide wheel to allow any trapped liquid to seep back out of the guide wheel. Also, as the guide wheel rotates, any liquid between the shield and seal is spun-out by centrifugal force.

16 Claims, 4 Drawing Sheets

U.S. PATENT DOCUMENTS

| | | | |
|---|---|---|---|
| 4,972,939 A | 11/1990 | Uttke | |
| 5,156,443 A | 10/1992 | Ide | |
| 5,188,214 A | 2/1993 | Uttke | |
| 5,193,363 A | 3/1993 | Petty | |
| 5,261,528 A | 11/1993 | Bouchal | |
| 5,320,214 A | 6/1994 | Kordis | |
| 5,419,642 A * | 5/1995 | McLarty | 384/486 |
| 5,445,260 A | 8/1995 | Foster | |
| 5,468,376 A | 11/1995 | Bates | |
| 5,513,743 A | 5/1996 | Brink | |
| 5,560,715 A * | 10/1996 | Mosby | 384/477 |
| 5,772,001 A | 6/1998 | Otruba | |
| 6,062,734 A * | 5/2000 | Bundgart | 384/477 |
| 6,076,647 A | 6/2000 | Agnoff | |
| 6,103,673 A | 8/2000 | Sumiejski | |
| 6,206,182 B1 | 3/2001 | Wilson | |
| 6,209,702 B1 | 4/2001 | Agnoff | |
| 6,250,639 B1 | 6/2001 | Hayes | |
| 6,357,926 B1 * | 3/2002 | Hauck et al. | 384/546 |
| 6,394,260 B1 | 5/2002 | Barth | |
| 6,419,070 B1 | 7/2002 | Agnoff | |
| 6,454,640 B1 | 9/2002 | Siedler | |
| 6,595,695 B1 * | 7/2003 | Goto | 384/482 |
| 6,604,397 B2 | 8/2003 | Patty | |
| 6,749,057 B2 | 6/2004 | Kato | |
| 6,766,895 B2 | 7/2004 | Matsumura | |
| 6,832,680 B1 | 12/2004 | Matsumura | |
| 6,938,754 B2 | 9/2005 | Kanaris | |
| 7,258,491 B2 * | 8/2007 | Gutowski et al. | 384/486 |
| 2002/0104355 A1 | 8/2002 | Patty | |
| 2003/0000271 A1 | 1/2003 | Patty | |

OTHER PUBLICATIONS

Ball Bearing Free-Wheel Clutches; http://www.gmnbt.com/ballbearing_installation.htm.

Rubber Springs Return Seals (RSR™); http://www.gtweed.com/85256D3C0038D8DA/vwContentByKey/N25R9HYV771ELETEN.

Search Results For: Bearing Seal Shield Guide Wheel Food; http://www.flrstgov.gov/fgsearch/index.jsp?nr=20&mt0=all&ms0...ion&submit=Search&rs=1&db=www-fed-all&st=AS&rn=1&pa.

* cited by examiner

US 7,588,372 B2

GUIDE WHEEL HAVING A BEARING FOR FOOD AND BEVERAGE APPLICATIONS

BACKGROUND OF THE INVENTION

1. Technical Field

The invention relates to a guide wheel. More particularly, the invention relates to a guide wheel having a bearing that is suited for food and beverage applications.

2. Description of the Prior Art

Guide wheels are used in the food and beverage industry. However, the service life of guide wheels is often cut short by a loss of bearing lubrication. Many times during the assembly line cleaning process, high pressure water with detergents is used to clean debris and sanitize the equipment. The high temperature blast of liquid pushes the bearing lubrication out of the guide wheel.

For example, machine builder PES Limited has created a new, eight axis (four axis horizontal, four axis vertical) poultry cutter machine. A chicken breast (meat and ribs) travels on a conveyor line and it is optically scanned by a camera. The digital image is mathematically scaled and a computer program determines the ultimate cutting pattern. A water jet cutter cuts the chicken breast to yield the highest volume of meat in various types of chicken meat cuts, such as boneless breast, nuggets, and strips. To meet the FDA sanitary requirements, caustic water solution under high pressure is used to clean the machine. The guide wheels are directly sprayed with the high pressure water solution which penetrates the current guide wheel bearing seals. The typical guide wheel life is six to twelve weeks.

It would be advantageous to provide a wheel design that eliminates direct liquid pressure on the seal, thus retaining the lubrication, such that bearing life is extended.

SUMMARY OF THE INVENTION

The invention provides a wheel design that incorporates both a shield and seal on both sides of the guide wheel to eliminate direct liquid pressure on the seal. By retaining the lubrication, bearing life is extended, dramatically reducing machine downtime. In the presently preferred embodiment, the combination of a guide wheel with two rubber spring return (RSR) seals in-bound of two shields, increases guide wheel life through the following: The shields prevent the direct force of a high pressure wash-down from reaching the seal directly. There is a non-direct path between the shield and the outer raceway of the guide wheel to allow any trapped liquid to seep back out of the guide wheel. Also, as the guide wheel rotates, any liquid between the shield and seal is spun-out by centrifugal force.

DETAILED DESCRIPTION OF THE INVENTION

The invention provides a wheel design that incorporates both a shield and seal on both sides of the guide wheel to eliminate direct liquid pressure on the seal. By retaining the lubrication, bearing life is extended, dramatically reducing machine downtime. In the presently preferred embodiment, the combination of a guide wheel with two rubber spring return (RSR) seals in-bound of two shields, increases guide wheel life through the following: The shields prevent the direct force of a high pressure wash-down from reaching the seal directly. There is a non-direct path between the shield and the outer raceway of the guide wheel to allow any trapped liquid to seep back out of the guide wheel. Also, as the guide wheel rotates, any liquid between the shield and seal is spun-out by centrifugal force.

Figure 1:
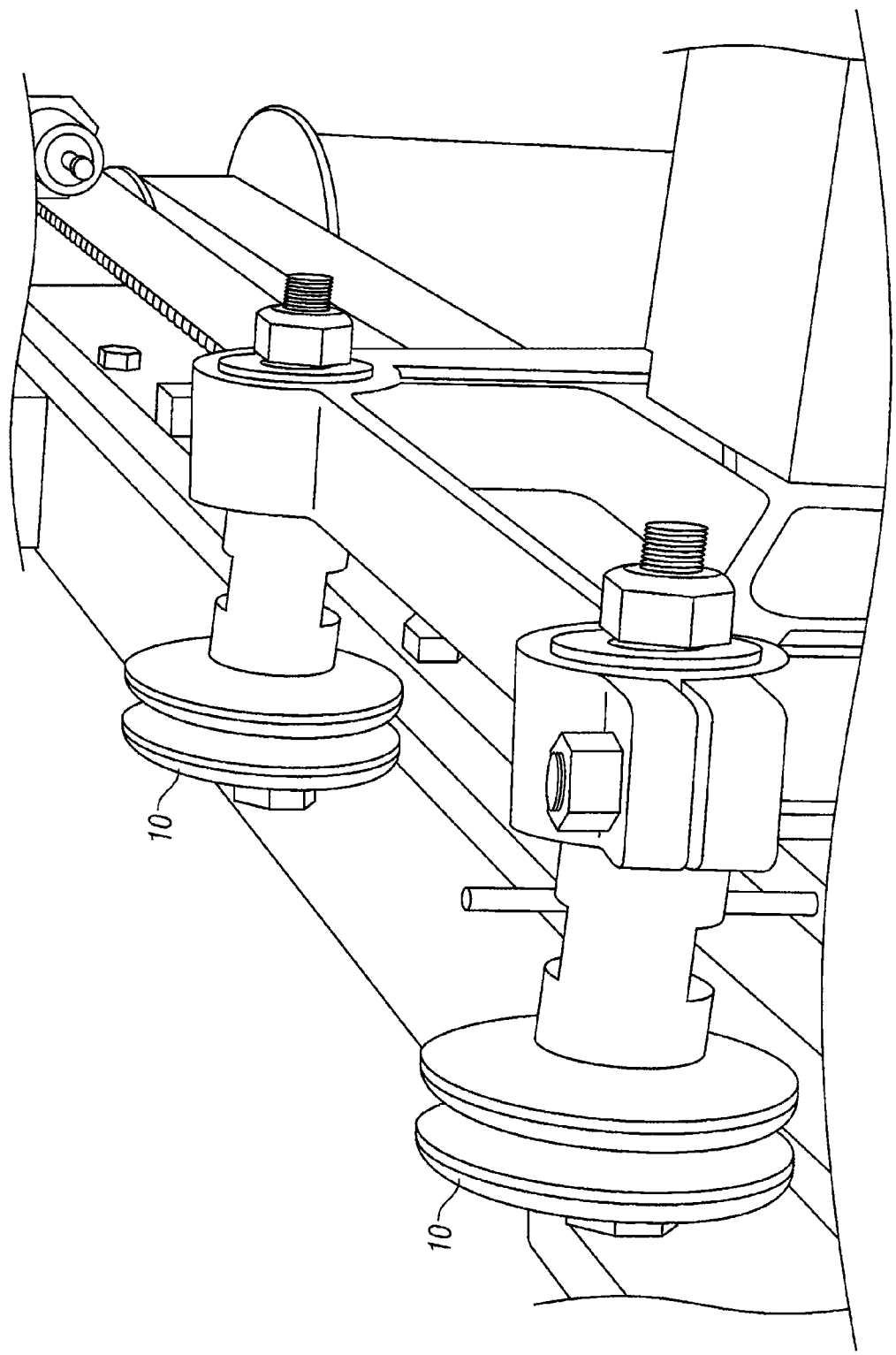
FIG. 1 is a perspective view of a food processing machine that incorporates a guide wheel having a bearing for food and beverage applications according to the invention.

FIG. 1 is a perspective view of a food processing machine that incorporates a guide wheel having a bearing for food and beverage applications according to the invention. In FIG. 1, two guide wheels 10 are shown in place in a food processing machine. Those skilled in the art will appreciate that the invention is useful in any application for which guide wheels are required, especially where the guide wheels may be subjected to repeated cleaning or other treatment that might otherwise dislodge the bearing lubricant within the wheel.

Figure 2:
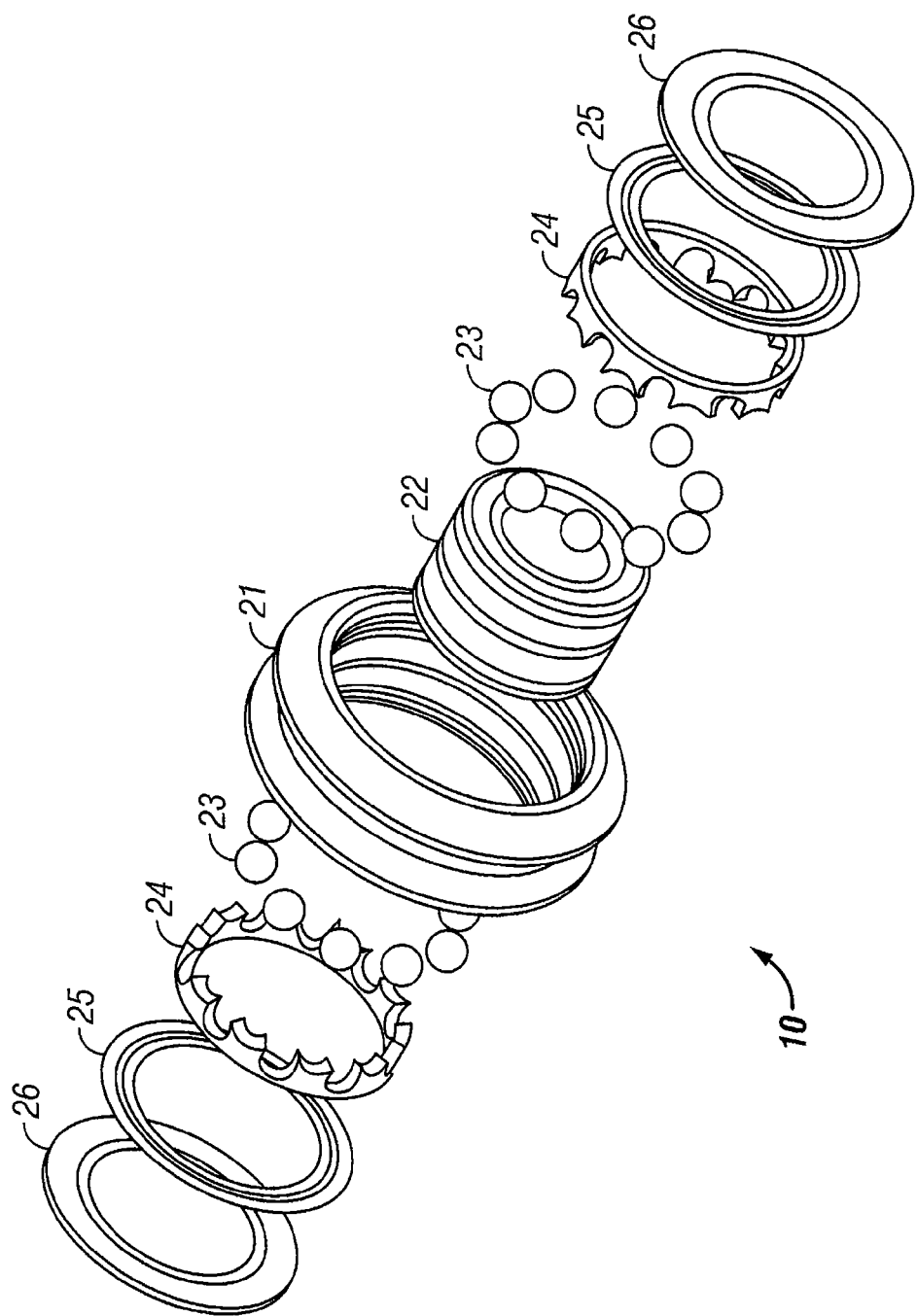
FIG. 2 is an exploded, perspective view of a guide wheel having a bearing for food and beverage applications according to the invention.

FIG. 2 is an exploded, perspective view of a guide wheel having a bearing for food and beverage applications according to the invention. In FIG. 2, an outer ring 21 is provided for contact with a conveyor belt or other guided member. In this regard, the outer ring 21 is shown having a V-shaped groove. Those skilled in the art will appreciate that the outer ring may have any sort of outer surface as is required by the application to which the guide wheel is put. An inner ring 22 is provided that has an inner dimension which allows the ring to mate to a shaft or other mounting. Those skilled in the art will appreciate that the inner diameter of the inner ring may be formed in any manner as required per the application to which the wheel is put. For example, a small aperture may be formed through which a fastener may be placed to secure the guide wheel assembly to a machine. Likewise, a larger opening may be provided for a shaft and the opening may be keyed to receive a keyed shaft, if desired.

A plurality of ball bearings 23 are secured between the outer ring and the inner ring by a pair of cages 24. The assembly novely provides a pair of RSR seals 25, which contact both the inner raceway and outer raceway. The pressure of the sealing lip contacting both raceways provides a barrier to liquid. To further reinforce the seal, the rubber seal material is molded over a stainless steel ring. The stainless steel ring provides the seal with the necessary structural integrity over the life of the wheel. The two RSR seals are inbound of two shields 26, which contact only the inner raceway. The shields are RZ reverse seals in the preferred embodiment. A non-direct path between the shield and the guidewheel 21 allows any trapped liquid to seep back out of the guide wheel. As the guide wheel rotates, any liquid between the shield and the seal is spun out by centrifugal force. Thus, high-pressure cleaning of the guide wheels does not disturb the RSR seal 25 because the shield 26 diverts the brunt of the washing flow.

Figure 3:
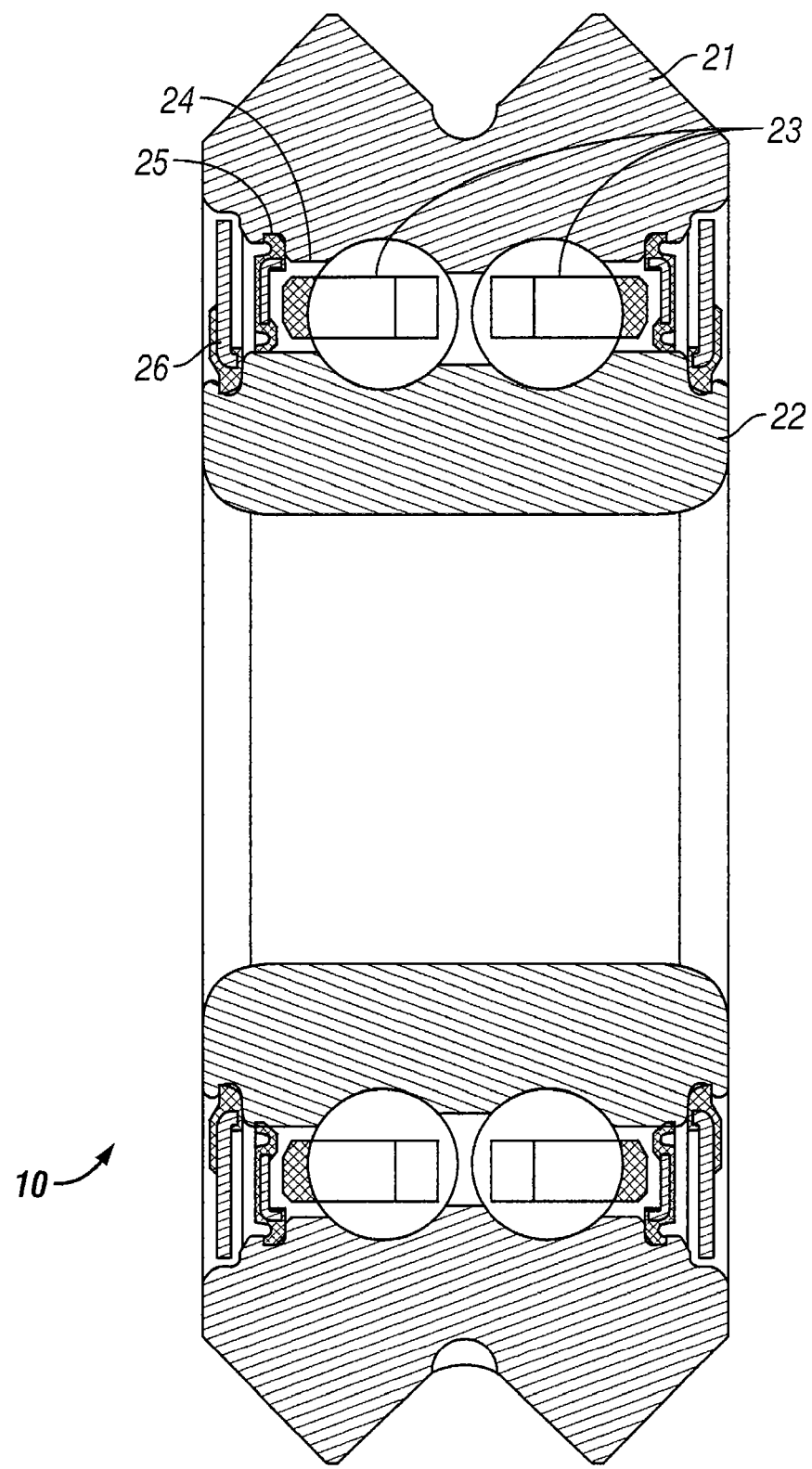
FIG. 3 is a section view of the guide wheel of FIG. 2 according to the invention.

FIG. 3 is a section view of the guide wheel of FIG. 2 according to the invention. As is shown in FIG. 3, the ball bearings 23 provide a bearing surface between the inner ring 22 and the outer ring 21. The ball bearings are held in position by a cage 24. Unique to the invention is that a pair of RSR seals 25 is provided to seal the bearings. Such seals typically do not withstand the intense pressure encountered in a food handling environment, when the bearings are used in guide wheels that must be washed after food processing operations. The addition of the shields 26 shown provides a deflection surface for deflecting a high pressure stream of washing liquid, while allowing the washing liquid to enter into the area behind the shield and, thus, wash that surface as well.

Figure 4:
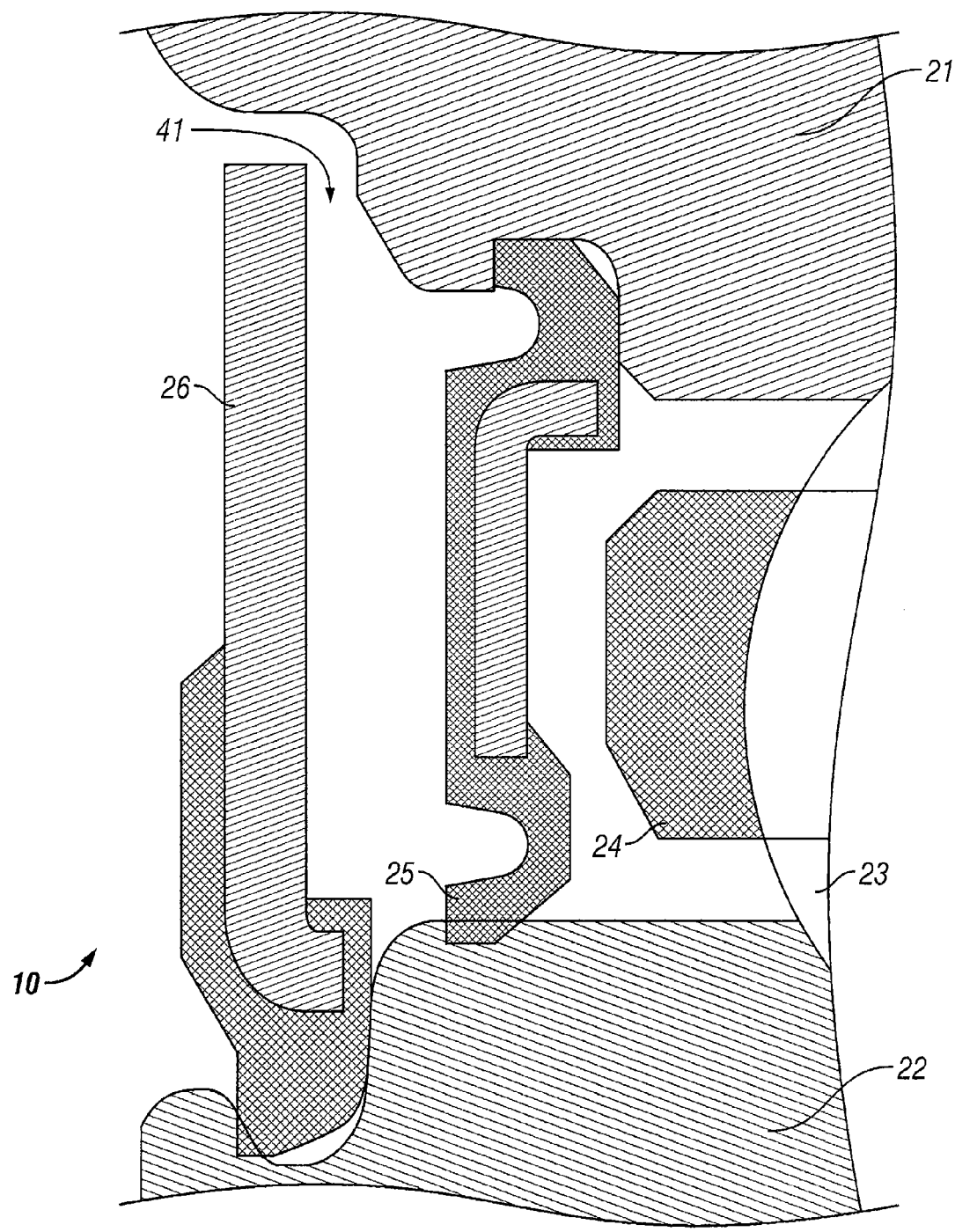
FIG. 4 is a detailed section view showing an enlargement of the region designated as "Z" in FIG. 3 according to the invention.

FIG. 4 is a detailed section view showing an enlargement of the region designated as "Z" in FIG. 3 according to the invention. Operation of the invention is better understood in connection with FIG. 4 in which it can be seen that a path 41 is provided along the outer raceway of the guide wheel 21, by which any trapped liquid can seep back out of the guide wheel.

In the preferred embodiment, the inner ring 21 is constructed of AISI 440C material and is subject to a heat treatment of 58-60 HRC. The RZ reverse seals (shields) are made of NBR/stainless steel. The ball bearings are made of AISI 440C and are subjected to a 58-60 HRC heat treatment. The RSR seals are made of NBR. The cages are made of PA66 GF25. The outer ring is made of AISI 440C and is subjected to a 58-60 HRC heat treatment. A lubricant is used within the bearing and, in the preferred embodiment, is Klübersynth Uh1 14-151 (40+/−5%). Those skilled in the art will appreciate that the materials, tolerances, treatments, and the like are a matter of choice. The invention is intended for use in many applications and, consequently, can be constructed in accordance with the application to which it is put. Customization of outer ring geometry and lubrication type can be readily accomplished for specific applications without sacrificing performance in wash down environments.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below:

The invention claimed is:

1. A guide wheel comprising:
an outer ring having an outer surface, a first side, a second side opposite said first side, and an opening defined between said first side to said second side, said opening having an inner raceway surface;
an inner ring located within said opening of said outer ring, said inner ring having an outer raceway surface;
a plurality of balls positioned between said outer raceway surface of said inner ring and said inner raceway surface of said outer ring, and providing a bearing surface there between;
a cage for securing said balls in position between said inner ring and said outer ring;
a shield comprising
a nitrile rubber ring that contacts said outer raceway surface of said inner ring, and
a shield element that extends from said nitrile rubber ring toward said inner raceway surface of said outer ring, wherein a space is defined between said shield element and said inner raceway surface of said outer ring; and
a seal located between said plurality of balls and said shield, said seal extending between said outer raceway surface of said inner ring and said inner raceway surface of said outer ring, said seal comprising
a first rubber seal surface that contacts said inner raceway surface of said outer ring, and
a second rubber seal surface that contacts said outer raceway surface of said inner ring.

2. The guide wheel of claim 1, wherein a V-shaped groove is defined on said outer surface of said outer ring.

3. The guide wheel of claim 1, wherein said outer surface of said outer ring provides contact for any of a conveyor belt or a guided member.

4. The guide wheel of claim 1, wherein an opening is defined through the center of said inner ring between said first side and said second side, and wherein opening of said inner ring is mateable to any of a shaft or mounting.

5. The guide wheel of claim 4, wherein said opening comprises an inner diameter.

6. The guide wheel of claim 4, wherein said shaft is keyed, and wherein said opening is keyed to receive said keyed shaft.

7. The guide wheel of claim 1, wherein said space between said shield element and said inner surface of said outer ring allows liquid trapped during a wash down operation to seep out of said guide wheel.

8. The guide wheel of claim 1, wherein said seal further comprises a stainless steel ring, and a rubber seal formed over said stainless steel ring, wherein said first rubber seal surface and said second rubber seal surface are provided by said rubber seal.

9. An apparatus comprising:
an outer ring having an outer surface, a first side, a second side opposite said first side, and an opening defined between said first side to said second side, said opening having an inner raceway surface;
an inner ring located within said opening of said outer ring, said inner ring having an outer raceway surface;
a plurality of balls positioned between said outer raceway surface of said inner ring and said inner raceway surface of said outer ring, and providing a bearing surface there between;
a cage for securing said balls in position between said inner ring and said outer ring;
a first shield and a second shield located on opposing sides of said plurality balls between said inner ring and said outer ring, each of said shields comprising
a nitrile rubber ring that contacts said outer raceway surface of said inner ring, and
a shield element that extends from said nitrile rubber ring toward said inner raceway surface of said outer ring; and
a first seal and a second seal, said first seal located between said plurality of balls and said first shield, said second seal located between said plurality of balls and said second shield, each of said seals extending between said outer raceway surface of said inner ring and said inner raceway surface of said outer ring, each of said seals comprising
a first rubber seal surface that contacts said inner raceway surface of said outer ring, and
a second rubber seal surface that contacts said outer raceway surface of said inner ring.

10. The apparatus of claim 9, wherein a V-shaped groove is defined on said outer surface of said outer ring.

11. The apparatus of claim 9, wherein said outer surface of said outer ring provides contact for any of a conveyor belt or a guided member.

12. The apparatus of claim 9, wherein an opening is defined through the center of said inner ring between said first side and said second side, and wherein opening of said inner ring is mateable to any of a shaft or mounting.

13. The apparatus of claim 12, wherein said opening of said inner ring comprises an inner diameter.

14. The apparatus of claim 12, wherein said shaft is keyed, and wherein said opening of said inner ring is keyed to receive said keyed shaft.

15. The apparatus of claim 9, wherein said space between said shield element and said inner surface of said outer ring allows liquid trapped during a wash down operation to seep out of said guide wheel.

16. The apparatus of claim 9, wherein said seal further comprises a stainless steel ring, and a rubber seal formed over said stainless steel ring, wherein said first rubber seal surface and said second rubber seal surface are provided by said rubber seal.

* * * * *